United States Patent
Haravu et al.

(10) Patent No.: US 11,513,909 B2
(45) Date of Patent: Nov. 29, 2022

(54) SYSTEM AND METHOD FOR SCHEDULED SNAPSHOT PACING WITH DEDUPLICATION

(71) Applicant: EMC IP Holding Company, LLC, Hopkinton, MA (US)

(72) Inventors: Nagasimha G. Haravu, Apex, NC (US); Qi Jin, Sudbury, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/231,403

(22) Filed: Apr. 15, 2021

(65) Prior Publication Data

US 2022/0334927 A1    Oct. 20, 2022

(51) Int. Cl.
*G06F 12/00*    (2006.01)
*G06F 11/14*    (2006.01)
*G06F 3/06*    (2006.01)

(52) U.S. Cl.
CPC .......... *G06F 11/1461* (2013.01); *G06F 3/067* (2013.01); *G06F 3/0619* (2013.01); *G06F 3/0652* (2013.01); *G06F 3/0659* (2013.01); *G06F 11/1451* (2013.01); *G06F 11/1464* (2013.01); *G06F 2201/84* (2013.01)

(58) Field of Classification Search
None
See application file for complete search history.

(56) References Cited

U.S. PATENT DOCUMENTS

2019/0108100 A1*   4/2019   Lyakas ................. G06F 3/0674
2021/0255933 A1*   8/2021   Puvvada ............ G06F 11/1469

* cited by examiner

*Primary Examiner* — Daniel D Tsui
(74) *Attorney, Agent, or Firm* — Brian J. Colandreo; Mark H. Whittenberger; Holland & Knight LLP

(57) ABSTRACT

A method, computer program product, and computer system for submitting, by a computing device, at least one snapshot request of a plurality of snapshots requests into a snapshot queue. How many snapshots of a plurality of snapshots are referencing a given point in time copy may be tracked, wherein the given point in time copy may be mapped to at least a portion of the plurality of snapshots. A desired executing time for the at least one snapshot request in the snapshot queue may be determined. The at least one snapshot request may be dequeued.

17 Claims, 7 Drawing Sheets

SYSTEM AND METHOD FOR SCHEDULED SNAPSHOT PACING WITH DEDUPLICATION

BACKGROUND

Scheduled snapshot operations for volumes, volume groups, file systems, VMware virtual volumes, etc. may be an important feature of data protection for both on-premise and cloud-based storage solutions. Scheduled snapshots may be created using snapshot rules. A snapshot rule generally may identify how frequently a snapshot needs to be taken and how long it needs to be retained. Multiple snapshot rules are typically grouped together into a protection policy, and the policy may potentially be assigned to thousands of storage objects (e.g., volume, file system, etc.). These independent snapshot rules may potentially execute at the same time against a large number of objects resulting in a surge of snapshot requests.

BRIEF SUMMARY OF DISCLOSURE

In one example implementation, a method, performed by one or more computing devices, may include but is not limited to submitting, by a computing device, at least one snapshot request of a plurality of snapshots requests into a snapshot queue. How many snapshots of a plurality of snapshots are referencing a given point in time copy may be tracked, wherein the given point in time copy may be mapped to at least a portion of the plurality of snapshots. A desired executing time for the at least one snapshot request in the snapshot queue may be determined. The at least one snapshot request may be dequeued.

One or more of the following example features may be included. The dequeuing may be based upon, at least in part, a centralized timer. Duplicate requests in the snapshot queue may be deduplicated. The dequeuing may be based upon, at least in part, at least one of an executing time of the at least one request being less than or equal to a current time and a duplicate request for a same storage object. The desired execution time may be based upon, at least in part, a storage object ID and a pacing window. An entry of the at least one snapshot request may be deleted. A reference count may be decremented from a reference count table.

In another example implementation, a computing system may include one or more processors and one or more memories configured to perform operations that may include but are not limited to submitting at least one snapshot request of a plurality of snapshots requests into a snapshot queue. How many snapshots of a plurality of snapshots are referencing a given point in time copy may be tracked, wherein the given point in time copy may be mapped to at least a portion of the plurality of snapshots. A desired executing time for the at least one snapshot request in the snapshot queue may be determined. The at least one snapshot request may be dequeued.

One or more of the following example features may be included. The dequeuing may be based upon, at least in part, a centralized timer. Duplicate requests in the snapshot queue may be deduplicated. The dequeuing may be based upon, at least in part, at least one of an executing time of the at least one request being less than or equal to a current time and a duplicate request for a same storage object. The desired execution time may be based upon, at least in part, a storage object ID and a pacing window. An entry of the at least one snapshot request may be deleted. A reference count may be decremented from a reference count table.

In another example implementation, a computer program product may reside on a computer readable storage medium having a plurality of instructions stored thereon which, when executed across one or more processors, may cause at least a portion of the one or more processors to perform operations that may include but are not limited to submitting at least one snapshot request of a plurality of snapshots requests into a snapshot queue. How many snapshots of a plurality of snapshots are referencing a given point in time copy may be tracked, wherein the given point in time copy may be mapped to at least a portion of the plurality of snapshots. A desired executing time for the at least one snapshot request in the snapshot queue may be determined. The at least one snapshot request may be dequeued.

One or more of the following example features may be included. The dequeuing may be based upon, at least in part, a centralized timer. Duplicate requests in the snapshot queue may be deduplicated. The dequeuing may be based upon, at least in part, at least one of an executing time of the at least one request being less than or equal to a current time and a duplicate request for a same storage object. The desired execution time may be based upon, at least in part, a storage object ID and a pacing window. An entry of the at least one snapshot request may be deleted. A reference count may be decremented from a reference count table.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
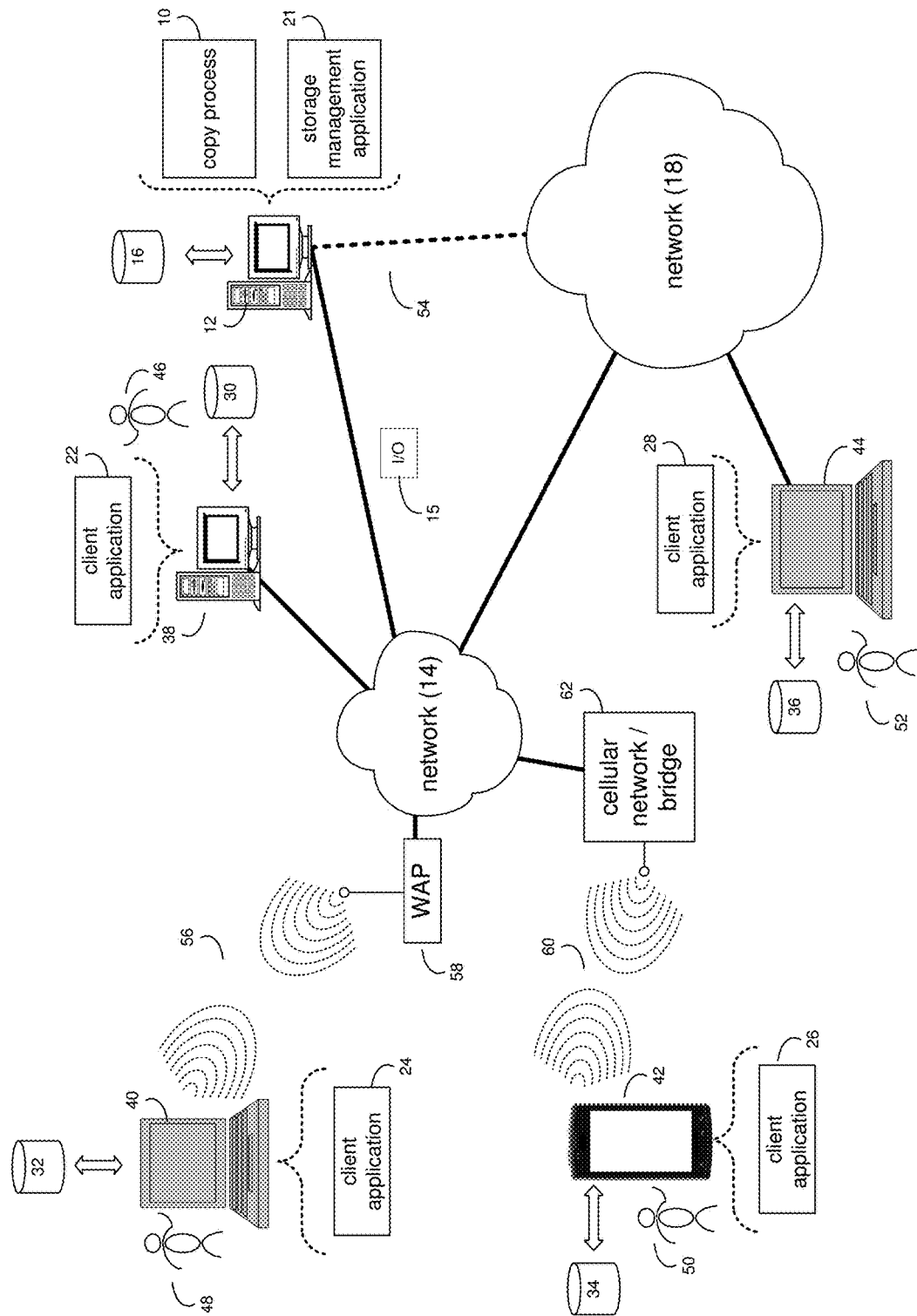
FIG. 1 is an example diagrammatic view of a copy process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown copy process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a copy process, such as copy process 10 of FIG. 1, may submit, by a computing device, at least one snapshot request of a plurality of snapshots requests into a snapshot queue. How many snapshots of a plurality of snapshots are referencing a given point in time copy may be tracked, wherein the given point in time copy may be mapped to at least a portion of the plurality of snapshots. A desired executing time for the at least one snapshot request in the snapshot queue may be determined. The at least one snapshot request may be dequeued.

In some implementations, the instruction sets and subroutines of copy process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, copy process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, copy process 10 and/or storage management application 21 may be accessed via one or more of client applications 22, 24, 26, 28. In some implementations, copy process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within copy process 10, a component of copy process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of copy process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of copy process 10 (and vice versa). Accordingly, in some implementations, copy process 10 may be a purely server-side application, a purely client-side application, or a hybrid server-side/client-side application that is cooperatively executed by one or more of client applications 22, 24, 26, 28 and/or copy process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, copy process 10, and storage management application 21, taken singly or in any combination, may effectuate some or all of the same functionality, any description of effectuating such functionality via one or more of client applications 22, 24, 26, 28, copy process 10, storage management application 21, or combination thereof, and any described interaction(s) between one or more of client applications 22, 24, 26, 28, copy process 10, storage management application 21, or combination thereof to effectuate such functionality, should be taken as an example only and not to limit the scope of the disclosure.

In some implementations, one or more of users 46, 48, 50, 52 may access computer 12 and copy process 10 (e.g., using one or more of client electronic devices 38, 40, 42, 44) directly through network 14 or through secondary network 18. Further, computer 12 may be connected to network 14 through secondary network 18, as illustrated with phantom link line 54. Copy process 10 may include one or more user interfaces, such as browsers and textual or graphical user interfaces, through which users 46, 48, 50, 52 may access copy process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
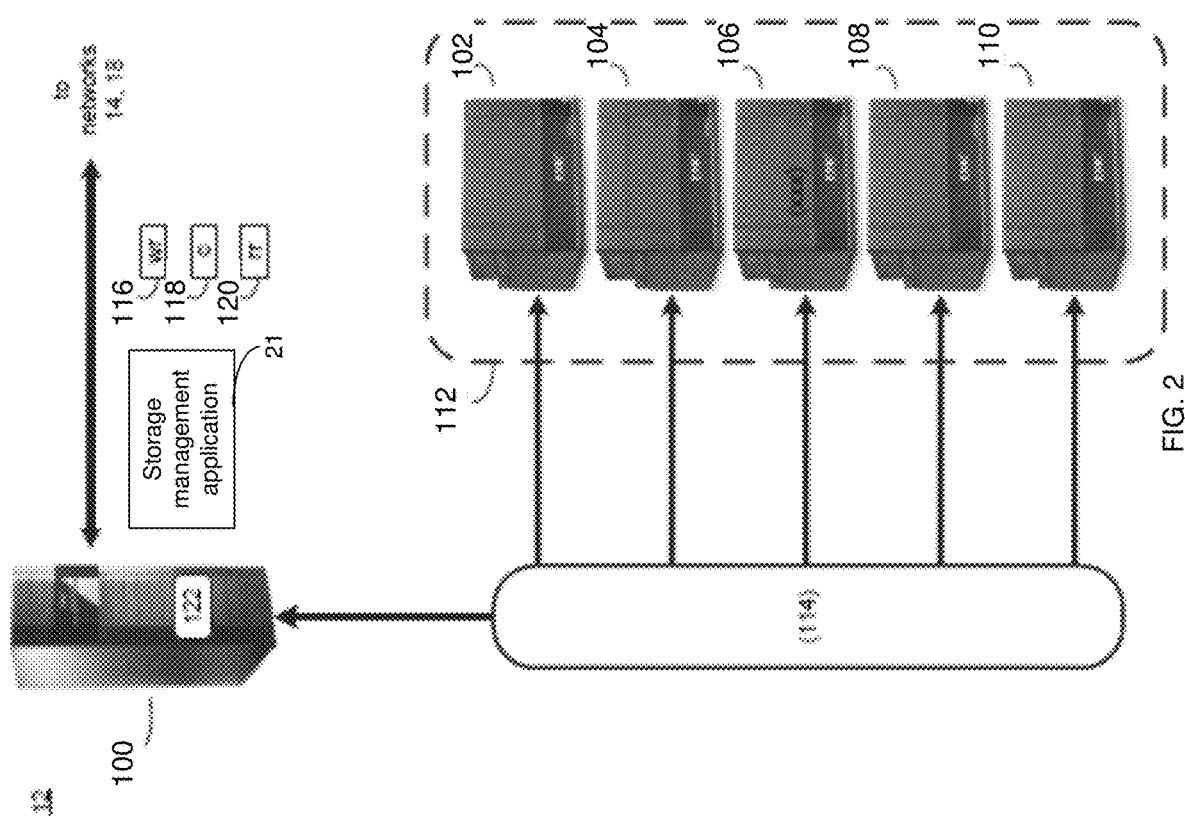
FIG. 2 is an example diagrammatic view of a storage system of FIG. 1 according to one or more example implementations of the disclosure.
Figure 3:
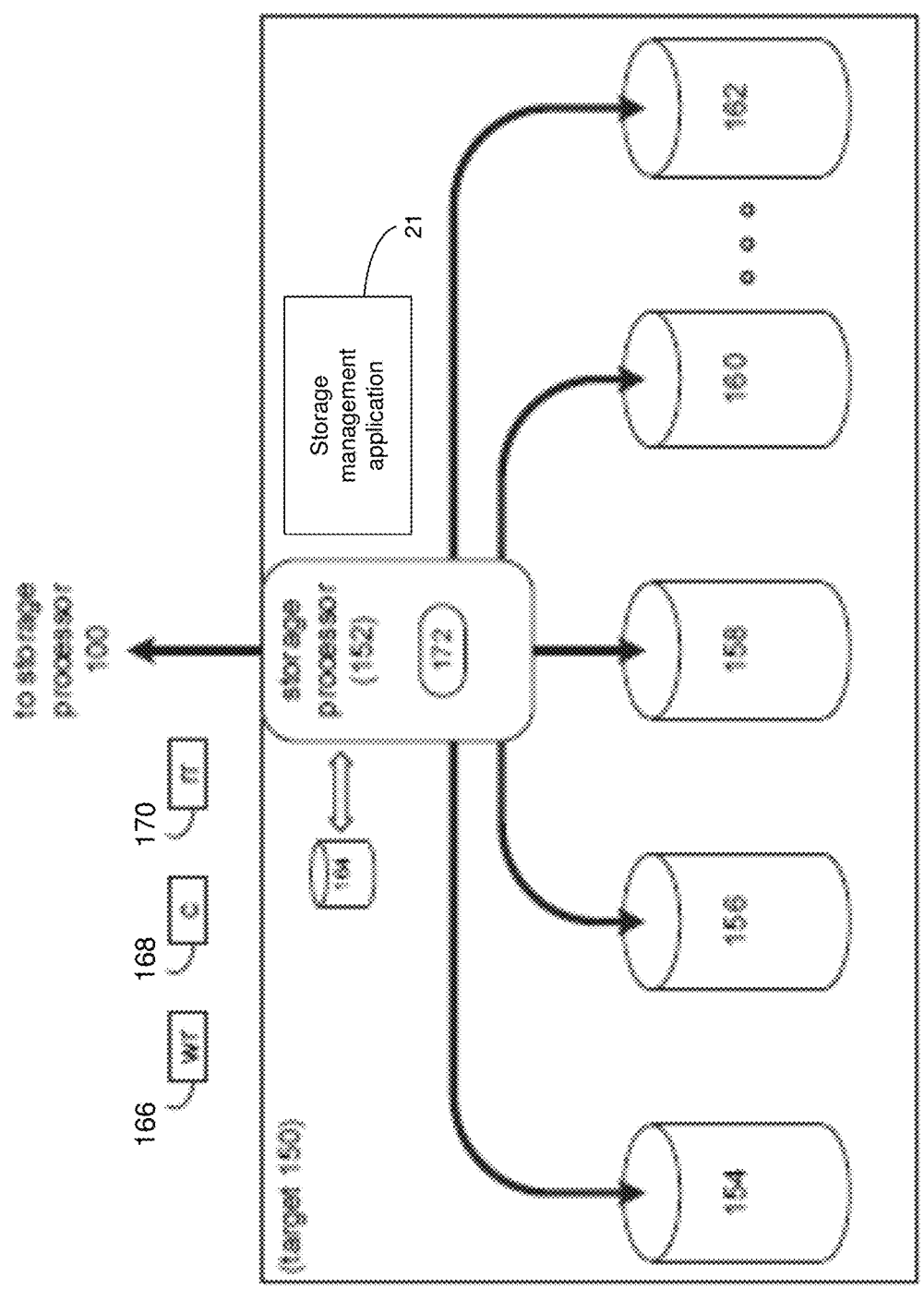
FIG. 3 is an example diagrammatic view of a storage target of FIG. 1 according to one or more example implementations of the disclosure.
Figure 4:
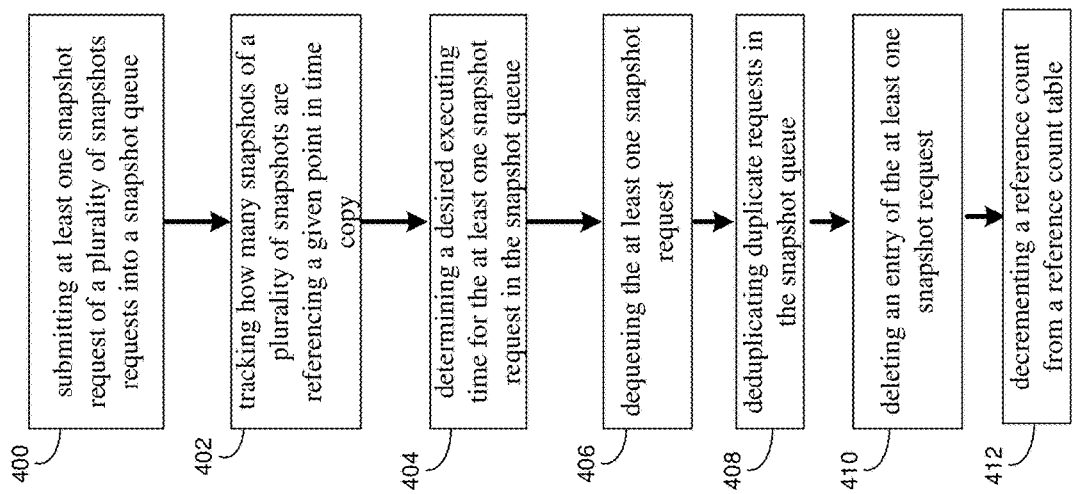
FIG. 4 is an example flowchart of a copy process according to one or more example implementations of the disclosure.
Figure 5:
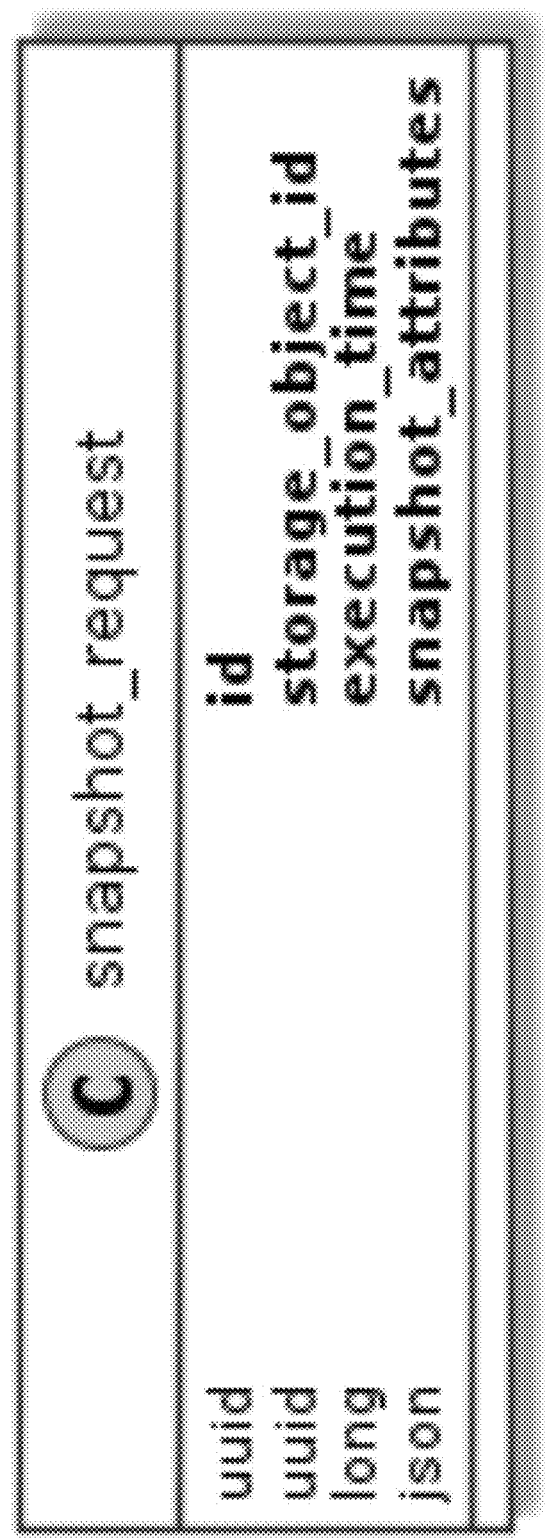
FIG. 5 is an example diagrammatic view of a snapshot request queue according to one or more example implementations of the disclosure.
Figure 6:
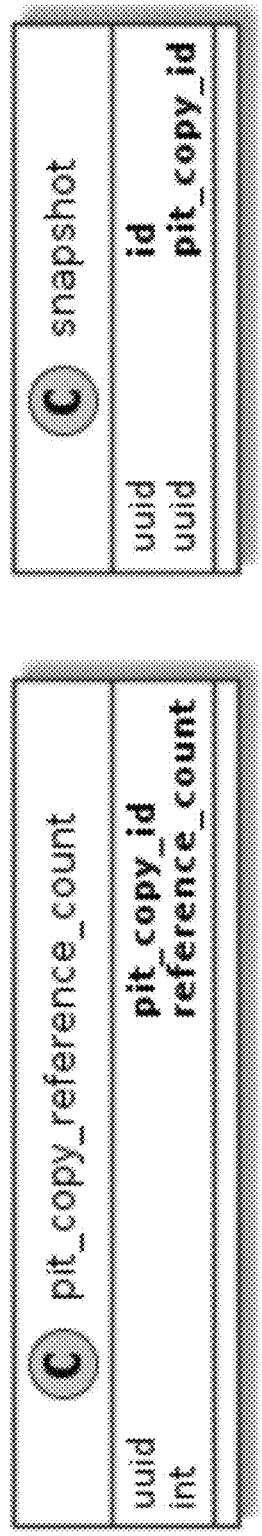
FIG. 6 is an example diagrammatic view of a PIT copy reference count table entry according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniB and network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or copy process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Scheduled snapshot operations for volumes, volume groups, file systems, VMware virtual volumes, etc. may be an important feature of data protection for both on-premise and cloud-based storage solutions. Scheduled snapshots may be created using snapshot rules. A snapshot rule generally may identify how frequently a snapshot needs to be taken and how long it needs to be retained. Multiple snapshot rules are typically grouped together into a protection policy, and the policy may potentially be assigned to thousands of storage objects (e.g., volume, file system, etc.). These independent snapshot rules may potentially execute at the same time against a large number of objects resulting in a surge of snapshot requests. When taking a snapshot, ongoing host IO may need to be momentarily quiesced. While individual snapshot requests are designed to be minimally impactful to host TO, a surge of snapshot requests across many objects at the same time may drag the overall system performance down resulting in spikes in system level latency spikes.

The snapshot rules of a policy may also overlap at certain times of the day resulting in multiple concurrent snapshot requests against the same object at the same time. For example, if a protection policy has one snapshot rule that executes every five minutes, one snapshot rule executes every thirty minutes and another snapshot rule executes every one hour, there may be three snapshot requests that create the three point-in-time (PIT) copies of the same data at the one hour mark sent to data path. Such multiple simultaneous snapshot requests on the same object may severely impact the performance of individual objects and exacerbate the latency spike at the system level.

Therefore, as will be discussed in greater detail below, the present disclosure may address the so-called "thundering herd" problem across the two dimensions. For example, multiple snapshot requests originating from a single rule may be spaced out across a relative time window by using an object id-based hashing algorithm. For example, a five minute snapshot rule applied to, e.g., 1000 objects would have previously generated 1000 requests at the same time. With the present disclosure, the requests may be partitioned across the five minute window such that a subset of requests are executed at a specific time offset from the start of this time window. Using an example hash on the object id may ensure the same offset is used for a given object every five minutes, thereby providing a consistent five minute differential between requests.

Additionally, concurrent snapshot requests against the same object from multiple rules may be deduplicated. Using a reference counting mechanism, a single PIT copy in data path may be associated with multiple requests and presented as multiple snapshots to the user. Each such deduplicated user-facing snapshot may have a distinct name and retention period. When the last of the deduplicated snapshots is deleted from the system, the actual PIT copy may be removed from the data path. Under the earlier example, at the top of an hour, the end user will see three distinct snapshots, one for each snapshot rule. But there will only be one request sent to data path to create a single PIT copy for all three snapshot rules. Both solutions may be incorporated into a common procedure using a system managed snapshot request queue as outlined below. For example purposes only, the present disclosure uses the standalone volume snapshot which has a PIT copy in data path and an end-user-visible snapshot in control path. However, it will be appreciated that the same concept may be similarly applied to other resource types as well.

The Copy Process:

As discussed above and referring also at least to the example implementations of FIGS. 4-7, copy process 10 may submit 400, by a computing device, at least one snapshot request of a plurality of snapshots requests into a snapshot queue. Copy process 10 may track 402 how many snapshots of a plurality of snapshots are referencing a given point in time copy. Copy process 10 may determine 404 a desired executing time for the at least one snapshot request in the snapshot queue. Copy process 10 may dequeue 406 the at least one snapshot request.

In some implementations, copy process 10 may submit 400, by a computing device, at least one snapshot request of a plurality of snapshots requests into a snapshot queue. For example, a snapshot request queue may be introduced in control path, and a reference count may be introduced in control path for a PIT copy created at data path. The reference count may prevent the system managed PIT copy from being deleted until all the referenced snapshot instances are gone. In some implementations, the snapshot creation requests coming from different snapshot rules may be placed in the snapshot queue with a desired execution time. When a snapshot request is triggered from a rule, the request will be submitted to the snapshot request queue. The persistent snapshot request queue 500 (shown in the example implementation of FIG. 5) may have the following example and non-limiting attributes:

id: The unique id of the snapshot request
    storage_object_id: The globally unique id of the storage object.
    execution_time: The computed execution time of the request (discussed further below).
    snapshot_attributes: Additional attributes that may be needed to fulfill the snapshot create request.

In some implementations, copy process 10 may track 402 how many snapshots of a plurality of snapshots are referencing a given point in time copy. For example, and referring to the example implementation of FIG. 6, an example table 600, pit_copy_reference_count, may be introduced in control path to keep track of how many snapshots are using a given PIT copy in data path. One PIT copy may have multiple references as it can be mapped to more than one snapshot instance. Snapshot instances may have distinct characteristics such as, e.g., snapshot name, retention periods, rule information, etc. The reference count may drop as the snapshot instances are deleted either by the user or by a snapshot aging service of copy process 10. The PIT copy in data path may stay until all the snapshots are deleted, i.e., the reference count is dropped to 0.

The pit_copy_reference_count table may have the following example and non-limiting attributes:

pit_copy_id: The unique id of PIT copy stored in data path.
    reference_count: How many control path snapshots are mapped to this PIT copy.

In some implementations, copy process 10 may determine 404 a desired executing time for the at least one snapshot request in the snapshot queue, which, in some implementations, the desired execution time may be based upon, at least in part, a storage object ID and a pacing window. For instance, when first considering an example without deduplication, an example algorithm may be used to calculate the execution time based on the storage object id and a pacing window. This may guarantee the pacing will be uniform and consistent for any given storage object. When a snapshot request is submitted into the system, the requester currently presents the globally unique object id for which the snapshot needs to be taken. Additional attributes such as the name of the snapshot, and an optional expiration time when the snapshot needs to be deleted may also be presented. This interface is enhanced so that the requester (e.g., via copy process 10) may present a time window, in seconds, within which the snapshot request needs to be executed.

When a snapshot request is originated from a rule, the time window may be set to an appropriate value based on the frequency setting in the rule. For example, if the snapshot frequency is five minutes or less, the time window offered is equal to the frequency. For larger frequencies (e.g., 15 minutes, 1 hour, etc.), the time window may be set to a fixed value of, e.g., five minutes.

A snapshot request arriving in the system may be first added to the snapshot request queue, as noted above. When adding a snapshot request to the queue, a targeted execution time may be determined 404 for the request as an offset from the submission time. An example and non-limiting algorithm of copy process 10 for generating the execution time is as follows, however, it will be appreciated that varying algorithms may be used:

A cryptographic hash is generated based on the object id.
    A modulo operation is performed on the hash to generate an offset between 0 and time window.
    The execution time is computed by adding the offset to the submission time.

For instance, the hashing function and the modulo operation ensures that for a given object id and a given time window, the same offset is always generated. For example, if a scheduled snapshot request arrives at 00:00:00 (HH:MM:SS) for an object with globally unique id of 1234-1234-1234-1234-1234, and the time window is 300 (five minutes), assume the resulting hash value is 23526. The modulo operation, 23526% 300, would result in an offset of, e.g., 126 (seconds). Therefore, the execution time for the request is set to 00:02:06. A subsequent request arriving at 00:05:00 for the same object with the same window would have its execution time set to 00:07:06, thereby ensuring a five minute differential in the execution time.

If a five minute snapshot rule triggered snapshot requests for 1000 objects with distinct globally unique ids at 00:00:00, the execution time for the 1000 requests would be distributed between 00:00:00 and 00:05:00.

Mathematically: Execution Time=Submission Time+ Offset, where Offset=hash(storage_object_id) % Time Window.

Next, consider the case with deduplication. When a snapshot request is submitted for an object that already has one or more pending requests submitted to the queue (e.g., from other rule(s)), the execution time for the new request may be first computed using the above method. If the execution time for the new request is earlier than the execution time for the pending requests, then the execution time for all the pending requests for the object may be set to the new execution time. Otherwise, the execution time of the new request may be set to the execution of an existing request (note in some implementations that all existing requests for the same object should have the same execution time).

In some implementations, copy process 10 may dequeue 406 the at least one snapshot request, where, in some implementations, the dequeuing 406 may be based upon, at least in part, a centralized timer, and/or at least one of an executing time of at least one request being less than or equal to a current time and a duplicate request for a same storage object. For example, a centralized timer-based process of copy process 10 may be introduced to submit requests for PIT copy creation/dequeuing the snapshot request queue. This process may run frequently and execute small chunks of requests with each run, and/or, in some implementations, the process (e.g., via copy process 10) may deduplicate 408 duplicate requests in the snapshot queue (e.g., deduplicate multiple requests against the same object). For example, the entries in the snapshot request queue may be dequeued based on a timer. When the dequeuing process of copy process 10 kicks in, it may retrieve all qualified snapshot requests—all requests with execution time less than or equal to current time and any duplicate requests for the same object may be served. The retrieved, deduplicated requests may then be batched and sent to the data path for execution. Once the data path processing is successfully completed, a response may be sent with the data path specific information for the PIT copies created. The above-noted pit_copy_reference_count table may be populated with the PIT copies created, one per object, and the reference count attribute may be set to the number of concurrent requests processed for the object. Each completed request may then be populated in the snapshot table. The requests may then be removed from the queue.

Figure 7:
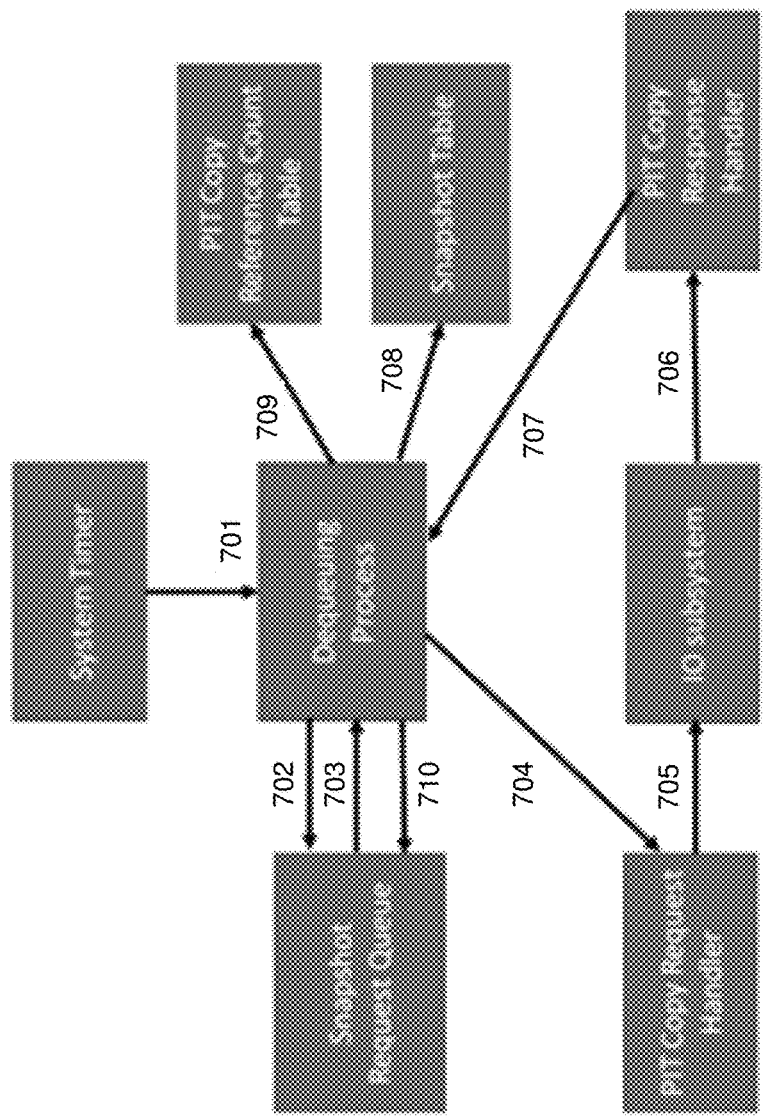
FIG. 7 is an example flowchart of a dequeuing/deduplication process of a copy process according to one or more example implementations of the disclosure.

An example dequeuing process 700 of copy process 10 is shown in the example implementation of FIG. 7. As shown in FIG. 7, the timer for dequeuing snapshot requests is triggered 701 by the system (e.g., via copy process 10). It starts the dequeuing process. Dequeuing process 700 may query 702 the snapshot request queue for qualified requests. All the requests that have the execution time set before the current time as qualified is considered, in other words, execution time<=current time. The snapshot request queue may return 703 all the qualified requests to dequeuing process 700. Dequeuing process 700 may send 704 all the qualified snapshot requests to PIT Copy Creation Request Handler. PIT copy request handler (e.g., via copy process 10) may deduplicate the requests. In some implementations, the PIT copy may be mapped to (and reference counted by) at least a portion of the plurality of snapshots. For example, when there is more than one request for creating PIT copy for the same storage object, only one PIT copy creation request to be sent to data path may be included. PIT copy request handler may send 705 the request to create PIT copies in the data path. Data path (e.g., via copy process 10) may create 706 PIT copies and send the response with PIT copy id, PIT copy source time, etc., to PIT copy response handler. PIT copy response handler may send 707 the mapping of the storage object id and PIT copy id back to the dequeuing process. The dequeuing process may create 708 the end user facing snapshot instances based for each qualified snapshot request using the PIT copy id and other parameters in the request. The dequeuing process may create 709 an entry for each PIT copy in the PIT copy reference count table to record how many user facing snapshots are referencing this PIT copy. The dequeuing process may clear 710 the executed qualified requests from the queue whether or not the PIT copy creation is successful or not.

In some implementations, copy process 10 may delete 410 an entry of the at least one snapshot request, and in some implementations, copy process 10 may decrement 412 a reference count from a reference count table. Put another way, copy process 10 may delete snapshot requests after they have been dequeued and served by the system, and the reference count may be decreased only when the snapshot itself is deleted. When a new snapshot is created, the reference count that references how many snapshots are using PIT may be increased. For example, when a snapshot delete request is submitted, the snapshot entry may be deleted from the snapshot table, and the reference_count may be decremented from the corresponding pit_copy_reference_count table. If the reference_count goes to zero, then the entry may be removed from the pit_copy_reference_count table, and an actual PIT copy delete request may be submitted to the data path.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:
1. A computer-implemented method comprising:
submitting, by a computing device, at least one snapshot request of a plurality of snapshots requests into a snapshot queue;
tracking how many snapshots of a plurality of snapshots are referencing a given point in time copy, wherein the given point in time copy is mapped to at least a portion of the plurality of snapshots;
determining a desired executing time for the at least one snapshot request in the snapshot queue;
dequeuing the at least one snapshot request; and
deduplicating duplicate requests in the snapshot queue.
2. The computer-implemented method of claim 1, wherein the dequeuing is based upon, at least in part, a centralized timer.

3. The computer-implemented method of claim 1, wherein the dequeuing is based upon, at least in part, at least one of an executing time of the at least one request being less than or equal to a current time and a duplicate request for a same storage object.

4. The computer-implemented method of claim 1, wherein the desired execution time is based upon, at least in part, a storage object ID and a pacing window.

5. The computer-implemented method of claim 3, further comprising deleting an entry of the at least one snapshot request.

6. The computer-implemented method of claim 5, further comprising decrementing a reference count from a reference count table.

7. A computer program product residing on a computer readable storage medium having a plurality of instructions stored thereon which, when executed across one or more processors, causes at least a portion of the one or more processors to perform operations comprising:
- submitting at least one snapshot request of a plurality of snapshots requests into a snapshot queue;
- tracking how many snapshots of a plurality of snapshots are referencing a given point in time copy, wherein the given point in time copy is mapped to at least a portion of the plurality of snapshots;
- determining a desired executing time for the at least one snapshot request in the snapshot queue; and
- dequeuing the at least one snapshot request, wherein the dequeuing is based upon, at least in part, a centralized timer.

8. The computer program product of claim 7, wherein the operations further comprise deduplicating duplicate requests in the snapshot queue.

9. The computer program product of claim 7, wherein the dequeuing is based upon, at least in part, at least one of an executing time of the at least one request being less than or equal to a current time and a duplicate request for a same storage object.

10. The computer program product of claim 7, wherein the desired execution time is based upon, at least in part, a storage object ID and a pacing window.

11. The computer program product of claim 9, wherein the operations further comprise deleting an entry of a snapshot associated with the at least one snapshot request.

12. The computer program product of claim 11, wherein the operations further comprise decrementing a reference count from a reference count table.

13. A computing system including one or more processors and one or more memories configured to perform operations comprising:
- submitting at least one snapshot request of a plurality of snapshots requests into a snapshot queue;
- tracking how many snapshots of a plurality of snapshots are referencing a given point in time copy, wherein the given point in time copy is mapped to at least a portion of the plurality of snapshots;
- determining a desired executing time for the at least one snapshot request in the snapshot queue; and
- dequeuing the at least one snapshot request, wherein the dequeuing is based upon, at least in part, at least one of an executing time of the at least one request being less than or equal to a current time and a duplicate request for a same storage object.

14. The computing system of claim 13, wherein the dequeuing is based upon, at least in part, a centralized timer.

15. The computing system of claim 13, wherein the operations further comprise deduplicating duplicate requests in the snapshot queue.

16. The computing system of claim 13, wherein the desired execution time is based upon, at least in part, a storage object ID and a pacing window.

17. The computing system of claim 13, wherein the operations further comprise deleting an entry of a snapshot associated with the at least one snapshot request and decrementing a reference count from a reference count table.

* * * * *